UNITED STATES PATENT OFFICE.

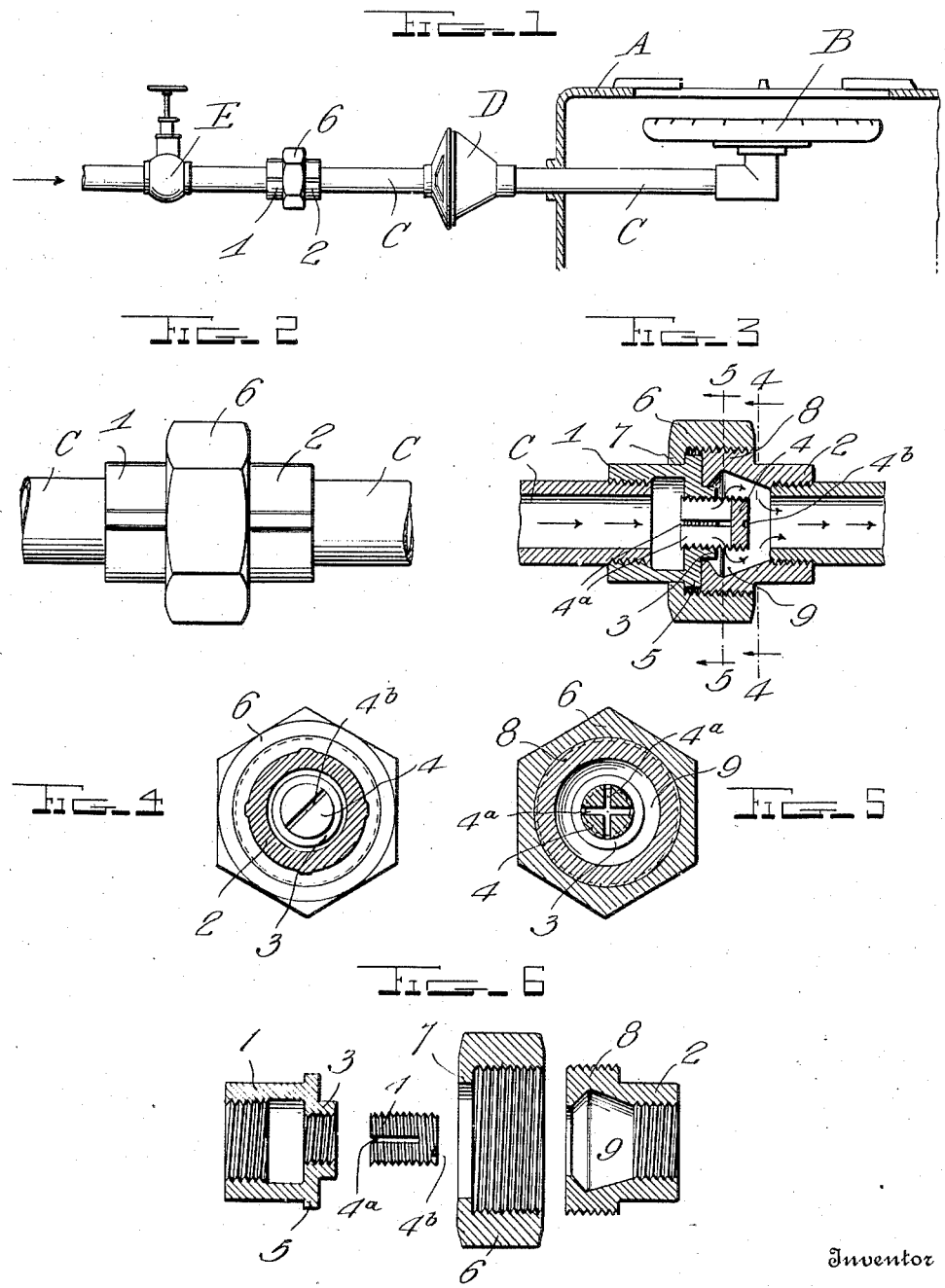

WILLIAM S. JONES, OF MEADVILLE, PENNSYLVANIA.

GAS MIXER AND REGULATOR.

1,078,584.  Specification of Letters Patent.  Patented Nov. 11, 1913.

Application filed November 11, 1912. Serial No. 730,726.

*To all whom it may concern:*

Be it known that I, WILLIAM S. JONES, a citizen of the United States, residing at Meadville, in the county of Crawford and State of Pennsylvania, have invented certain new and useful Improvements in Gas Mixers and Regulators; and I do declare the following to be a full, clear, and exact description of the invention, such as will enable others skilled in the art to which it appertains to make and use the same.

This invention relates to a combined coupling and valve especially designed as an auxiliary gas mixer and regulator.

The object of the invention is to provide a device of this character constructed to thoroughly mix gas and air in the supply pipe thereby forming a mixture which will produce a perfect combustion and thus consume a minimum amount of gas to accomplish a maximum result.

Another object of the invention is to provide a device for limiting the amount of gas that can be turned on regardless of how wide the valve may be opened.

With these and other objects in view, the invention consists of certain novel features of construction, and the combination and arrangement of parts as will be more fully described and claimed.

In the accompaning drawings; Figure 1 represents a side elevation of a gas pipe equipped with this improvement and shown in connection with a gas stove burner; Fig. 2 is an enlarged side elevation of this improved mixer and regulator; Fig. 3 is a longitudinal vertical section thereof; Fig. 4 is a transverse vertical section taken on the line 4—4 of Fig. 3; Fig. 5 is a similar view taken on the line 5—5 of Fig. 3; Fig. 6 is a longitudinal vertical section of the various parts of this improved mixer arranged in juxtaposition ready for assembling.

In the embodiment illustrated a gas stove A is shown with a burner B of ordinary construction connected therewith, said burner being supplied by a gas pipe C provided with the usual mixing chamber D and controlled by a valve E such as is ordinarily employed for this purpose.

Arranged between the valve E and mixing chamber D in the pipe C is this improved gas mixer and regulator which comprises two coupling members 1 and 2 internally threaded at one end for engagement with the adjacent sections of the pipe C. The coupling member 1 has one end reduced and internally threaded as shown at 3 to receive a slotted screw plug 4 to be hereinafter described. This coupling member 1 is also provided with a laterally extending annular flange 5 arranged at the base of the reduced portion 3 and which is adapted to be engaged by a coupling nut 6 having an inturned annular flange 7 for engaging the flange 5 as shown clearly in Fig. 3. This nut 6 is provided with the usual internal screw threads for engaging an externally threaded enlargement 8 on the coupling member 2. This coupling member 2 is internally threaded at its outer end for engaging an externally threaded end of the pipe section and the bore of said coupling member in advance of the internal threads thereof is enlarged as shown at 9 to form an expansion chamber surrounding the head of the screw plug 4 when the parts are assembled for permitting the gas to circulate freely around said plug on its exit therefrom through the slots 4ª therein. This screw plug 4 which constitutes the detachable member of the valve is slotted longitudinally at right angles as shown at 4ª, (see Fig. 5), said slots extending the greater portion of the length of said plug and forming outlets for the gas from the coupling member 1 into the expanding chamber 9, the amount of gas admitted through the slots being controlled by the distance which said plug is screwed into or out of the reduced extension 3 of the member 1. This plug has a kerf 4ᵇ for the reception of the screw driver for adjusting the plug into or out of the coupling or extension 3 and thereby controlling the amount of gas supplied to the chamber 9 which regulates the flame of the burner.

In assembling the parts of this device the plug 4 is first adjusted in the nipple 3 to regulate the size of the openings formed by the slots 4ª to the maximum flame desired and the member 1 is then screwed onto the pipe section to which it is to be applied. The other member 2 is similarly connected with the adjacent pipe section and the said members 1 and 2 are brought together in the position shown in Fig. 3 with their outer ends abutting and are connected by the coupling nut 6 in the usual manner, the flange 7 of said nut engaging the flange 5 of the member 1 and when screwed in the proper direction draws these members closely together. The pipe line is thus closed and the amount of gas consumed can not be increased regardless of how far open the valve E may be and to change the adjustment it is necessary to obtain access to the screw plug 4. The gas passing through the slots 4ª in the plug 4 enters the enlarged chamber 9 surrounding said plug where it is thoroughly agitated and expanded and flows out through the ordinary mixer D to the burner B where a perfect combustion is formed when the gas is ignited.

To obtain the best results this mixing device or regulator must be placed not more than three feet from the burner B.

While I have described my invention with more or less minuteness as regards details and as being embodied in certain precise forms, I do not desire to be limited thereto unduly any more than is pointed out in the claim. On the contrary, I contemplate all proper changes in form, construction and arrangement, the omission of immaterial elements and substitution of equivalents as circumstances may suggest or render expedient.

I claim as my invention:

A gas regulator comprising two coupling members internally threaded at one end for engagement with adjacent pipe sections, one of said members having one end reduced and offset to form a shoulder, said reduced end being interiorly threaded, an annular laterally extending flange at the base of said reduced portion, the other coupling member having an enlarged exteriorly threaded end and adapted to abut the shoulder on the reduced end of the first mentioned coupling member, the enlarged end of said coupling member being recessed to form a gas expansion chamber, a screw plug adjustable in the reduced end of said first mentioned coupling member and slotted longitudinally for a greater portion of its length, said plug discharging into said expansion chamber, and a coupling nut having an inturned flange at one end for engagement with the flange of said first mentioned coupling member and interiorly threaded for engagement with the exterior threads on the enlargement of the other coupling member.

In testimony whereof I have hereunto set my hand in presence of two subscribing witnesses.

WILLIAM S. JONES.

Witnesses:
JACOB J. EILER,
HERBERT J. JONES.